(12) United States Patent
Li et al.

(10) Patent No.: US 11,172,496 B2
(45) Date of Patent: Nov. 9, 2021

(54) SUBFRAME SCHEDULING METHOD AND BASE STATION

(71) Applicant: HUAWEI TECHNOLOGIES CO., LTD., Shenzhen (CN)

(72) Inventors: Xiaocui Li, Beijing (CN); Kai Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 128 days.

(21) Appl. No.: 16/348,157

(22) PCT Filed: Dec. 30, 2016

(86) PCT No.: PCT/CN2016/113562
§ 371 (c)(1),
(2) Date: May 8, 2019

(87) PCT Pub. No.: WO2018/086232
PCT Pub. Date: May 17, 2018

(65) Prior Publication Data
US 2019/0373623 A1 Dec. 5, 2019

(30) Foreign Application Priority Data
Nov. 8, 2016 (CN) .......................... 201610980988.1

(51) Int. Cl.
*H04W 72/04* (2009.01)
*H04W 72/12* (2009.01)
*H04W 16/14* (2009.01)
(52) U.S. Cl.
CPC ....... *H04W 72/1263* (2013.01); *H04W 16/14* (2013.01); *H04W 72/042* (2013.01); *H04W 72/0446* (2013.01)

(58) Field of Classification Search
CPC .......... H04W 72/1263; H04W 72/042; H04W 72/0446; H04W 16/14
See application file for complete search history.

(56) References Cited

U.S. PATENT DOCUMENTS

| 2016/0227545 A1 | 8/2016 | Yang et al. |
| 2016/0301555 A1 | 10/2016 | Nory et al. |

(Continued)

FOREIGN PATENT DOCUMENTS

| CN | 102281638 A | 12/2011 |
| CN | 104144513 A | 11/2014 |

(Continued)

OTHER PUBLICATIONS

RP-131788 Ericsson et al.,"Study on LTE Evolution for Unlicensed Spectrum Deployments",3GPP TSG RAN Meeting #62,dated Nov. 6, 2012,total 6 pages.

(Continued)

*Primary Examiner* — Kent Krueger
(74) *Attorney, Agent, or Firm* — Maier & Maier, PLLC

(57) ABSTRACT

A subframe scheduling method and a base station are disclosed. The method is applied to the base station and includes: when preempting an unlicensed carrier, obtaining, by the base station, a starting position of the preempted unlicensed carrier; determining a first number and a type of a first subframe based on the starting position, where the first number is a symbol number corresponding to the starting position that is used by the base station to send data, and the first subframe is a subframe in which a symbol corresponding to the first number is located; and sending the type of the first subframe and the first number to a terminal. In embodiments of the present invention, a processing process of the terminal can be simplified.

16 Claims, 3 Drawing Sheets

(56) References Cited

U.S. PATENT DOCUMENTS

| | | | | |
|---|---|---|---|---|
| 2017/0237463 | A1* | 8/2017 | Zheng | H04W 16/14 |
| | | | | 370/328 |
| 2017/0347355 | A1* | 11/2017 | Gou | H04W 74/0808 |
| 2017/0353866 | A1* | 12/2017 | Gou | H04W 72/0486 |
| 2018/0098361 | A1* | 4/2018 | Ji | H04L 5/0092 |
| 2018/0219667 | A1 | 8/2018 | Zhao et al. | |
| 2019/0069312 | A1* | 2/2019 | Oh | H04W 72/04 |
| 2020/0028640 | A1* | 1/2020 | Yeo | H04L 5/0051 |
| 2020/0169375 | A1* | 5/2020 | Yi | H04L 5/001 |

FOREIGN PATENT DOCUMENTS

| | | | |
|---|---|---|---|
| CN | 105282858 A | 1/2016 | |
| CN | 105357162 A | 2/2016 | |
| CN | 105850194 A | 8/2016 | |
| CN | 105871526 A | 8/2016 | |
| CN | 105992346 A | 10/2016 | |
| EP | 3151601 A1 | 4/2017 | |
| EP | 3200515 A1 | 8/2017 | |
| JP | 2016174216 A | 9/2016 | |
| WO | 2012141887 A2 | 10/2012 | |
| WO | 2015180551 A1 | 12/2015 | |
| WO | 2016029826 A1 | 3/2016 | |
| WO | 2016121730 A1 | 8/2016 | |
| WO | 2016169399 A1 | 10/2016 | |

OTHER PUBLICATIONS

Final draft ETSI EN 301 893 V1.8.0 (Jan. 2015),Broadband Radio Access Networks(BRAN);5 GHz high performance RLAN;Harmonized EN covering the essential requirementsof article 3.2 of the RandTTE Directive ,total 93 pages.

3GPP TR 36.889 V13.0.0 (Jun. 2016),3rd Generation Partnership Project;Technical Specification Group Radio Access Network;Study on Licensed-Assisted Access to Unlicensed Spectrum;(Release 13),total 87 pages.

3GPP TS 36.211 V13.2.0 (Jun. 2016),3rd Generation Partnership Project;Technical Specification Group Radio Access Network;Evolved Universal Terrestrial Radio Access (E-UTRA);Physical channels and modulation(Release13),dated Jun. 2016,total 168 pages.

XP051159653 R1-1609740 Nokia et al.,"On the UL control channel structure for NR",3GPP TSG-RAN WG1 #86 Bis, Lisbon, Portugal, Oct. 10-14, 2016,total 6 pages.

* cited by examiner

SUBFRAME SCHEDULING METHOD AND BASE STATION

CROSS-REFERENCE TO RELATED APPLICATIONS

This application is a national stage of International Application No. PCT/CN2016/113562, filed on Dec. 30, 2017, which claims priority to Chinese Patent Application No. 201610980988.1, filed on Nov. 8, 2016. Both of the aforementioned applications are hereby incorporated by reference in their entireties.

TECHNICAL FIELD

The present invention relates to the field of communications technologies, and specifically, to a subframe scheduling method and a base station.

BACKGROUND

Spectra used in a wireless communications system include a licensed spectrum (licensed spectrum) and an unlicensed spectrum (unlicensed spectrum). The licensed spectrum is a spectrum that can be used only by an authorized user, and the unlicensed spectrum is a spectrum that can be used by any user. A carrier on the licensed spectrum is referred to as a licensed carrier, and a carrier on the unlicensed spectrum is referred to as an unlicensed carrier. Therefore, when needing to use the unlicensed spectrum, a base station needs to preempt a channel in a listen before talk (Listen Before Talk, LBT) manner. Currently, in a licensed-assisted access using Long Term Evolution (Licensed-Assisted Access Using Long Term Evolution, LAA-LTE) system, after preempting a channel, the base station sends, to a terminal, a number of a start symbol for sending data, so that the terminal can receive and demodulate the corresponding data by using the number. However, a mini-slot (mini-slot) type is added to research of a 3GPP RAN1 5G frame structure. Therefore, if only the number of the start symbol for sending data is sent to the terminal when the data is sent on a 5G unlicensed carrier, in this case, the terminal does not know a type of a frame structure that may be included in the sub-frame. Consequently, receiving complexity on a terminal side is increased.

SUMMARY

Embodiments of the present invention disclose a subframe scheduling method and a base station, so as to simplify a processing process of a terminal.

A first aspect discloses a subframe scheduling method. The method is applied to a base station. When preempting an unlicensed carrier, the base station obtains a starting position of the preempted unlicensed carrier, determines a first number and a type of a first subframe based on the starting position of the preempted unlicensed carrier, and sends the type of the first subframe and the first number to a terminal. The first number is a symbol number corresponding to the starting position that is in the first subframe and that is used by the base station to send data, and the first subframe is a subframe in which a symbol corresponding to the first number is located. Because the type of the first subframe is sent to the terminal, the terminal may determine a corresponding receiving and demodulation scheme of the first subframe based on the type of the first subframe, so that a processing process of the terminal can be simplified.

In an embodiment, a quantity of symbols that may be included in a mini-slot is greater than 0 and is less than 7, and when the quantity of symbols included in the mini-slot is variable, and the starting position is a symbol boundary and the symbol number corresponding to the starting position is 0, it is determined that the type of the first subframe is a subframe, and it is determined that the first number is 0; when the starting position is a symbol boundary and the symbol number corresponding to the starting position is greater than 0 and is less than 7, it is determined that the type of the first subframe is a mini-slot and a slot, and it is determined that the first number is the symbol number corresponding to the starting position; when the starting position is not a symbol boundary and the symbol number corresponding to the starting position is greater than or equal to 0 and is less than 6, it is determined that the type of the first subframe is a mini-slot and a slot, and it is determined that the first number is a next number adjacent to the symbol number corresponding to the starting position; or when the starting position is not a symbol boundary and the symbol number corresponding to the starting position is 6, it is determined that the type of the first subframe is a slot, and it is determined that the first number is 7. The type of the first subframe may include a subframe, a mini-slot and a slot, a slot, and a mini-slot. The subframe indicates that data is sent starting from a symbol 0 in the first subframe, the mini-slot and the slot indicate that data is sent starting from any one of a symbol 1 to a symbol 6 that are in the first subframe, the slot indicates that data is sent starting from a symbol 7 in the first subframe, and the mini-slot indicates that data is sent starting from any one of a symbol 8 to a symbol 13 that are in the first subframe. Therefore, when the quantity of symbols included in the mini-slot is variable, and the starting position is a symbol boundary and the symbol number corresponding to the starting position is greater than 0 and is less than 7, or the starting position is not a symbol boundary and the symbol number corresponding to the starting position is greater than or equal to 0 and is less than 6, data may be sent by using a symbol before the symbol 7 in the first subframe without a need to wait to send the data starting from the symbol 7. Therefore, a quantity of symbols used to send data may be increased, so that channel utilization can be increased while a processing process of the terminal is simplified.

In an embodiment, when the quantity of symbols included in the mini-slot is variable, and the starting position is a symbol boundary and the symbol number corresponding to the starting position is 7, it is determined that the type of the first subframe is a slot, and it is determined that the first number is 7; when the starting position is a symbol boundary and the symbol number corresponding to the starting position is greater than 7 and is less than 14, it is determined that the type of the first subframe is a mini-slot, and it is determined that the first number is the symbol number corresponding to the starting position; when the starting position is not a symbol boundary and the symbol number corresponding to the starting position is greater than or equal to 7 and is less than 13, it is determined that the type of the first subframe is a mini-slot, and it is determined that the first number is a next number adjacent to the symbol number corresponding to the starting position; or when the starting position is not a symbol boundary and the symbol number corresponding to the starting position is 13, it is determined that the type of the first subframe is a subframe, and it is determined that the first number is 0. Therefore, when the quantity of symbols included in the mini-slot is variable, and the starting position is a symbol boundary and the symbol number corresponding to the starting position is greater than 7 and is less than 14, or the starting position is not a symbol boundary and the symbol number corresponding to the starting position is greater than or equal to 7 and is less than 13, data may be sent starting from any one of a symbol 8 to a symbol 13 that are in the first subframe without a need to wait to send the data starting from a next subframe. Therefore, data of symbols used to send data may be increased, so that channel utilization can be increased while a processing process of the terminal is simplified.

In an embodiment, when a quantity of symbols included in a mini-slot is fixed, and the starting position is a symbol boundary and the symbol number corresponding to the starting position is 0, it is determined that the type of the first subframe is a subframe, and it is determined that the first number is 0; when the starting position is a symbol boundary and the symbol number corresponding to the starting position is greater than 0 and is less than 7, the symbol number corresponding to the starting position is subtracted from 7, to obtain a first symbol quantity; when the first symbol quantity is greater than or equal to a second symbol quantity, it is determined that the type of the first subframe is a mini-slot and a slot, a remainder is calculated by dividing the first symbol quantity by the second symbol quantity, and it is determined that the first number is a sum of the symbol number corresponding to the starting position and the remainder, where the second symbol quantity is equal to the quantity of symbols included in the mini-slot; or when the first symbol quantity is less than the second symbol quantity, it is determined that the type of the first subframe is a slot, and it is determined that the first number is 7. When the quantity of symbols included in the mini-slot is fixed, and the starting position is a symbol boundary, the symbol number corresponding to the starting position is greater than 0 and is less than 7, and the first symbol quantity is greater than or equal to the second symbol quantity, data may be sent by using a symbol before a symbol 7 in the first subframe without a need to wait to send the data starting from the symbol 7. Therefore, data of symbols used to send data may be increased, so that channel utilization can be increased while a processing process of the terminal is simplified.

In an embodiment, when the quantity of symbols included in the mini-slot is fixed, and the starting position is not a symbol boundary and the symbol number corresponding to the starting position is greater than or equal to 0 and is less than 6, a second number is subtracted from 7 to obtain a first symbol quantity, where the second number is a next number adjacent to the symbol number corresponding to the starting position; when the first symbol quantity is greater than or equal to the second symbol quantity, it is determined that the type of the first subframe is a mini-slot and a slot, a remainder is calculated by dividing the first symbol quantity by the second symbol quantity, and it is determined that the first number is a sum of the second number and the remainder; when the first symbol quantity is less than the second symbol quantity, it is determined that the type of the first subframe is a slot, and it is determined that the first number is 7; or when the starting position is not a symbol boundary and the symbol number corresponding to the starting position is 6, it is determined that the type of the first subframe is a slot, and it is determined that the first number is 7. When the quantity of symbols included in the mini-slot is fixed, and the starting position is not a symbol boundary, the symbol number corresponding to the starting position is greater than or equal to 0 and is less than 6, and the first symbol quantity is greater than or equal to the second symbol quantity, data may be sent by using a symbol before the symbol 7 in the first subframe without a need to wait to send the data starting from the symbol 7. Therefore, data of symbols used to send data may be increased, so that channel utilization can be increased while a processing process of the terminal is simplified.

In an embodiment, when the quantity of symbols included in the mini-slot is fixed, and the starting position is a symbol boundary and the symbol number corresponding to the starting position is 7, it is determined that the type of the first subframe is a slot, and it is determined that the first number is 7; when the starting position is a symbol boundary and the symbol number corresponding to the starting position is greater than 7 and is less than 14, the symbol number corresponding to the starting position is subtracted from 14, to obtain a first symbol quantity; when the first symbol quantity is greater than or equal to the second symbol quantity, it is determined that the type of the first subframe is a mini-slot, a remainder is calculated by dividing the first symbol quantity by the second symbol quantity, and it is determined that the first number is a sum of the symbol number corresponding to the starting position and the remainder; or when the first symbol quantity is less than the second symbol quantity, it is determined that the type of the first subframe is a subframe, and it is determined that the first number is 0. When the quantity of symbols included in the mini-slot is fixed, and the starting position is a symbol boundary, the symbol number corresponding to the starting position is greater than 7 and is less than 14, and the first symbol quantity is greater than or equal to the second symbol quantity, data may be sent starting from any one of a symbol 8 to a symbol 13 that are in the first subframe without a need to wait to send the data starting from a next subframe. Therefore, data of symbols used to send data may be increased, so that channel utilization can be increased while a processing process of the terminal is simplified.

In an embodiment, when the quantity of symbols included in the mini-slot is fixed, and the starting position is not a symbol boundary and the symbol number corresponding to the starting position is greater than or equal to 7 and is less than 13, a second number is subtracted from 14 to obtain a first symbol quantity, where the second number is a next number adjacent to the symbol number corresponding to the starting position; when the first symbol quantity is greater than or equal to the second symbol quantity, it is determined that the type of the first subframe is a mini-slot, a remainder is calculated by dividing the first symbol quantity by the second symbol quantity, and it is determined that the first number is a sum of the second number and the remainder; when the first symbol quantity is less than the second symbol quantity, it is determined that the type of the first subframe is a subframe, and it is determined that the first number is 0; or when the starting position is not a symbol boundary and the symbol number corresponding to the starting position is 13, it is determined that the type of the first subframe is a subframe, and it is determined that the first number is 0. When the quantity of symbols included in the mini-slot is fixed, and the starting position is not a symbol boundary, the symbol number corresponding to the starting position is greater than or equal to 7 and is less than 13, and the first symbol quantity is greater than or equal to the second symbol quantity, data may be sent starting from any one of a symbol 8 to a symbol 13 that are in the first subframe without a need to wait to send the data starting from a next subframe. Therefore, data of symbols used to send data may be increased, so that channel utilization can be increased while a processing process of the terminal is simplified.

In an embodiment, the type of the first subframe and the first number may be sent to the terminal by using downlink control information (Downlink Control Information, DCI).

In an embodiment, new bit information may be added to the DCI or current bit information may be reused to send the type of the first subframe and the first number to the terminal.

A second aspect discloses a base station, where the base station includes units configured to perform the subframe scheduling method provided in any one of the first aspect or the possible implementations of the first aspect.

A third aspect discloses a base station, including a processor, a memory, and a transceiver, where a set of program code is stored in the memory, and the processor is configured to invoke the program code stored in the memory to perform the following operations:

when preempting an unlicensed carrier, obtaining, by the base station, a starting position of the preempted unlicensed carrier; and determining a first number and a type of a first subframe based on the starting position, where the first number is a symbol number corresponding to the starting position that is used by the base station to send data, and the first subframe is a subframe in which a symbol corresponding to the first number is located; and the transceiver is configured to send the type of the first subframe and the first number to a terminal.

A fourth aspect discloses a readable storage medium, where the readable storage medium stores program code that is used by a base station to perform the subframe method disclosed in any one of the first aspect or the possible implementations of the first aspect.

DESCRIPTION OF EMBODIMENTS

Embodiments of the present invention disclose a subframe scheduling method and a base station, so as to simplify a processing process of a terminal.

Figure 1:
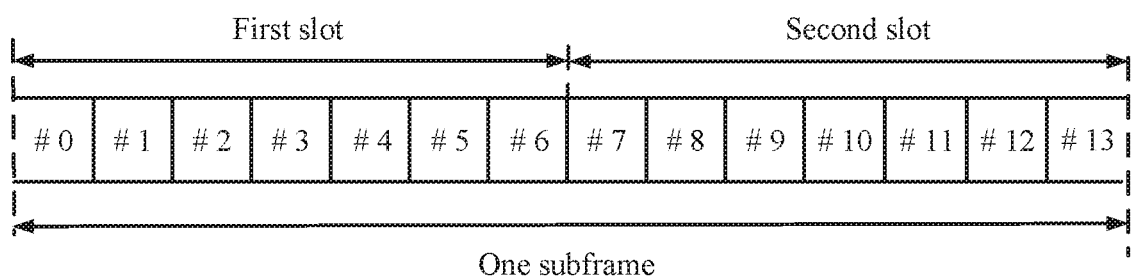
FIG. 1 is a schematic diagram of a subframe according to an embodiment of the present invention.

To better understand the subframe scheduling method and the base station that are disclosed in the embodiments of the present invention, a concept of the base station used in the embodiments of the present invention is first described below. Currently, in a conventional LTE 4G network, the base station sends data by using a subframe as a basic unit, one subframe includes 14 symbols, one subframe includes two slots (slot), each slot includes seven symbols, and symbol numbers in one subframe start from 0 and end at 13. Referring to FIG. 1, FIG. 1 is a schematic diagram of a subframe according to an embodiment of the present invention. As shown in FIG. 1, a symbol 1 to a symbol 6 are a first slot and a symbol 7 to a symbol 13 are a second slot. Currently, in an LAA-LTE system, after preempting a channel, a base station can send data starting only from a symbol 0 or a symbol 7. Therefore, when the preempted channel is not in the symbol 0 or the symbol 7, a reservation signal (reservation signal) needs to be sent to a slot boundary or a subframe boundary. The reservation signal is used to occupy the channel, so that the channel is not preempted by another network node. However, no data is sent by using the reservation signal. When the preempted channel is not in the symbol 0 or the symbol 7, the reservation signal needs to be sent to the slot boundary or the subframe boundary, but no data is sent by using the reservation signal. Consequently, channel utilization is reduced. In addition, this embodiment of the present invention provides a new concept, that is, a mini-slot (mini-slot). A quantity of symbols included in the mini-slot is less than that included in a slot, and the quantity of included symbols is greater than 0 and is less than 7.

Figure 2:
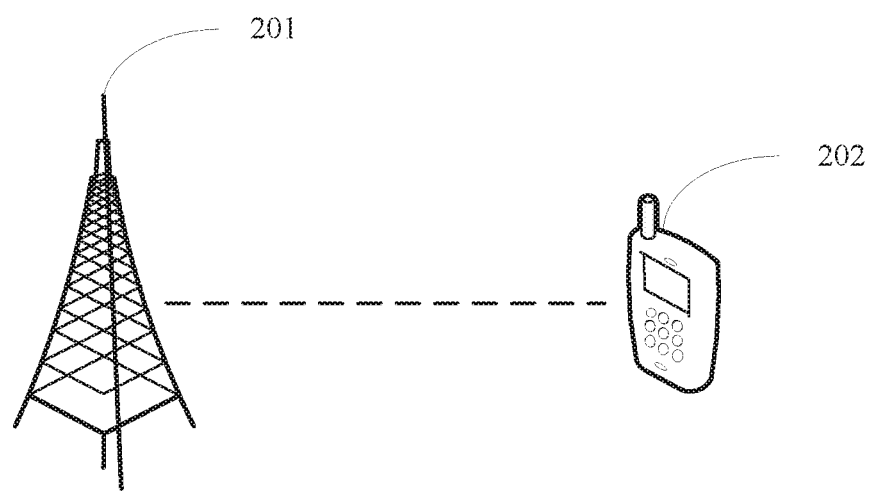
FIG. 2 is a schematic diagram of a network architecture according to an embodiment of the present invention.

To better understand a subframe scheduling method and a base station that are disclosed in the embodiments of the present invention, a network architecture used in the embodiments of the present invention is first described below. Referring to FIG. 2, FIG. 2 is a schematic diagram of a network architecture according to an embodiment of the present invention. As shown in FIG. 2, the network architecture may include a base station 201 and a terminal 202. The base station 201 may be connected to the terminal 202 by using a network. When the base station 201 needs to communicate with the terminal 202 by using an unlicensed carrier, the base station 201 is configured to: preempt the unlicensed carrier, determine, based on a starting position of the preempted unlicensed carrier, a symbol number corresponding to the starting position used to send data and a type of a first subframe used to send data, send the determined symbol number and the determined type of the first subframe to the terminal 202 by using a licensed carrier or the unlicensed carrier, and send to-be-sent data to the terminal 202 by using the preempted unlicensed carrier. The terminal 202 is configured to: receive the symbol number, the type of the first subframe, and the to-be-transmitted data that are sent by the base station 201, determine, based on the type of the first subframe, a decoding scheme used to decode the first subframe, and then decode the to-be-transmitted data based on the decoding scheme and the symbol number. The type of the first subframe may include a subframe, a mini-slot and a slot, a slot, and a mini-slot. The subframe indicates that data is sent starting from a symbol 0 in the first subframe, the mini-slot and the slot indicate that data is sent starting from any one of a symbol 1 to a symbol 6 that are in the first subframe, the slot indicates that data is sent starting from a symbol 7 in the first subframe, and the mini-slot indicates that data is sent starting from any one of a symbol 8 to a symbol 13 that are in the first subframe. Definitions of the subframe and the slot may be the same as or different from conventional definitions. The base station 101 may be a device that communicates with the terminal by using one or more sectors over an air interface in an access network such as an evolved NodeB (evolved NodeB, NodeB, eNB, or e-NodeB) in a Long Term Evolution (Long Term Evolution, LTE) system or a Long Term Evolution Advanced (LIE-Advanced, LTE-A) system, or a gNB or a g-NodeB in a 5G new radio (New Radio, NR) technology. The base station 201 may be configured to mutually convert a received air frame and an Internet Protocol (Internet Protocol, IP) packet, and is used as a router between the terminal and a remaining part of the access network, where the remaining part of the access network may include an IP network; and may be further configured to coordinate attribute management of the air interface.

Figure 3:
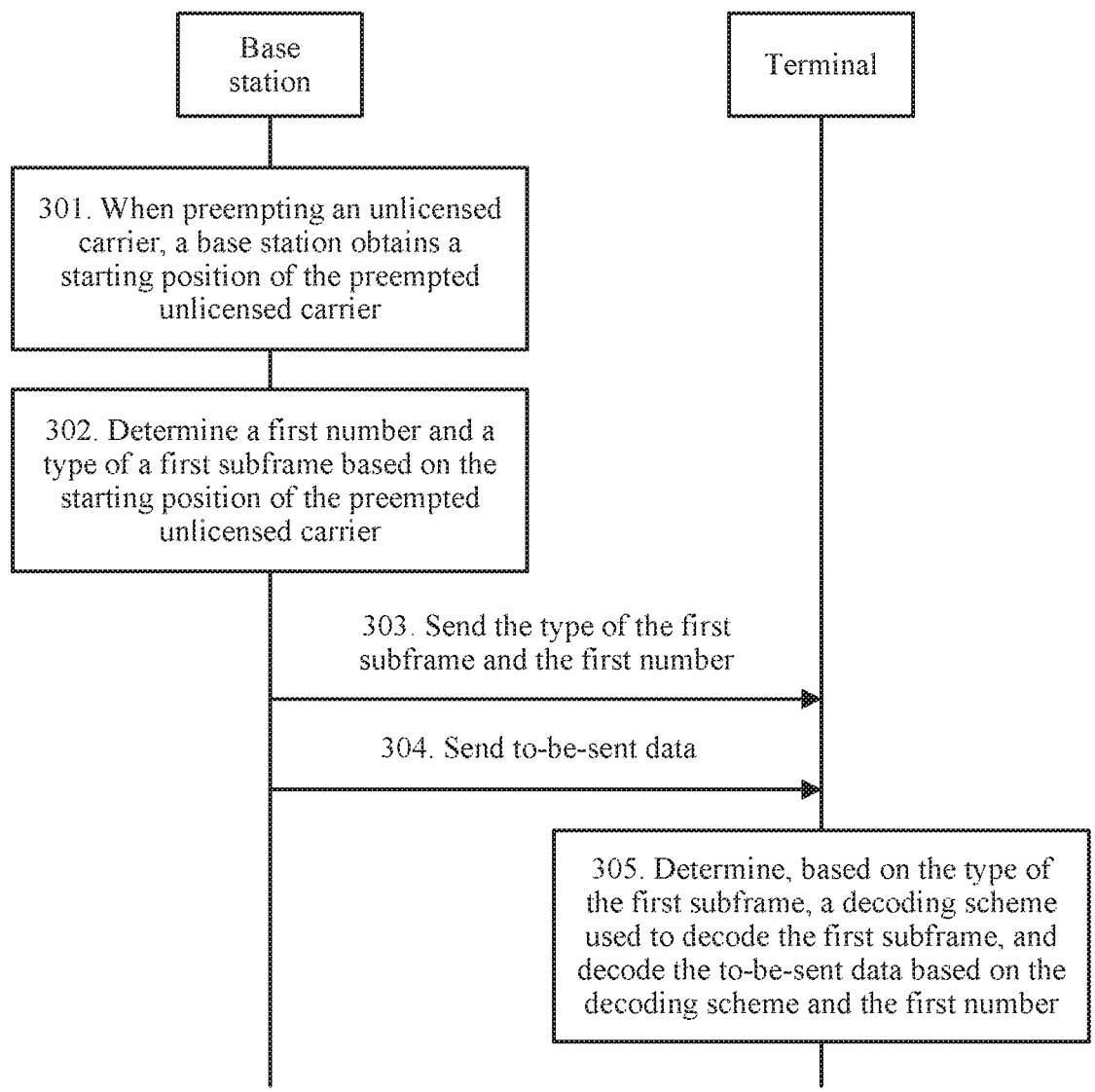
FIG. 3 is a schematic flowchart of a subframe scheduling method according to an embodiment of the present invention.

Based on the network architecture shown in FIG. 2, referring to FIG. 3, FIG. 3 is a schematic flowchart of a subframe scheduling method according to an embodiment of the present invention. The subframe scheduling method is described from a perspective of the base station 101 and the terminal 102. As shown in FIG. 3, the subframe scheduling method may include the following steps.

301. When the base station preempts an unlicensed carrier, the base station obtains a starting position of the preempted unlicensed carrier.

In this embodiment, when needing to communicate with the terminal by using an unlicensed carrier, the base station preempts the unlicensed carrier in an LBT manner. When preempting the unlicensed carrier, the base station obtains the starting position of the preempted unlicensed carrier.

302. The base station determines a first number and a type of a first subframe based on the starting position of the preempted unlicensed carrier.

In this embodiment, after obtaining the starting position of the preempted unlicensed carrier, the base station determines the first number and the type of the first subframe based on the starting position of the preempted unlicensed carrier. The first number is a symbol number corresponding to the starting position used to send data, and the first subframe is a subframe in which a symbol corresponding to the first number is located.

In this embodiment, when a quantity of symbols included in a mini-slot is variable, and the starting position of the preempted unlicensed carrier is a symbol boundary and the symbol number corresponding to the starting position of the preempted unlicensed carrier is 0, the type of the first subframe is a subframe, and the first number is 0. The symbol boundary is a starting position of a symbol, and is not an intermediate position or an end position of a symbol.

In this embodiment, when the quantity of symbols included in the mini-slot is variable, and the starting position of the preempted unlicensed carrier is a symbol boundary and the symbol number corresponding to the starting position of the preempted unlicensed carrier is greater than 0 and is less than 7, the type of the first subframe is a mini-slot and a slot, and the first number is the symbol number corresponding to the starting position of the preempted unlicensed carrier. The mini-slot of the mini-slot and the slot includes a quantity of symbols that is obtained by subtracting the first number from 7.

In this embodiment, when the quantity of symbols included in the mini-slot is variable, and the starting position of the preempted unlicensed carrier is not a symbol boundary and the symbol number corresponding to the starting position of the preempted unlicensed carrier is greater than or equal to 0 and is less than 6, the type of the first subframe is a mini-slot and a slot, and the first number is a next number adjacent to the symbol number corresponding to the starting position of the preempted unlicensed carrier. The mini-slot of the mini-slot and the slot includes a quantity of symbols that is obtained by subtracting the first number from 7, and a position between the starting position of the preempted unlicensed carrier and the first number is used to send a reservation symbol.

In this embodiment, when the quantity of symbols included in the mini-slot is variable, and the starting position of the preempted unlicensed carrier is not a symbol boundary and the symbol number corresponding to the starting position of the preempted unlicensed carrier is 6, the type of the first subframe is a slot, and the first number is 7. A position between the starting position of the preempted unlicensed carrier and the first number is used to send a reservation symbol.

In this embodiment, when the quantity of symbols included in the mini-slot is variable, and the starting position of the preempted unlicensed carrier is a symbol boundary and the symbol number corresponding to the starting position of the preempted unlicensed carrier is 7, the type of the first subframe is a slot, and the first number is 7.

In this embodiment, when the quantity of symbols included in the mini-slot is variable, and the starting position of the preempted unlicensed carrier is a symbol boundary and the symbol number corresponding to the starting position of the preempted unlicensed carrier is greater than 7 and is less than 14, the type of the first subframe is a mini-slot, and the first number is the symbol number corresponding to the starting position of the preempted unlicensed carrier. The mini-slot includes a quantity of symbols that is obtained by subtracting the first number from 14.

In this embodiment, when the quantity of symbols included in the mini-slot is variable, and the starting position of the preempted unlicensed carrier is not a symbol boundary and the symbol number corresponding to the starting position of the preempted unlicensed carrier is greater than or equal to 7 and is less than 13, the type of the first subframe is a mini-slot, and the first number is a next number adjacent to the symbol number corresponding to the starting position of the preempted unlicensed carrier. The mini-slot includes a quantity of symbols that is obtained by subtracting the first number from 14. A position between the starting position of the preempted unlicensed carrier and the first number is used to send a reservation symbol.

In this embodiment, when the quantity of symbols included in the mini-slot is variable, and the starting position of the preempted unlicensed carrier is not a symbol boundary and the symbol number corresponding to the starting position of the preempted unlicensed carrier is 13, the type of the first subframe is a subframe, and the first number is 0. A position between the starting position of the preempted unlicensed carrier and the first number is used to send a reservation symbol.

In this embodiment, when a quantity of symbols included in a mini-slot is fixed, and the starting position of the preempted unlicensed carrier is a symbol boundary and the symbol number corresponding to the starting position of the preempted unlicensed carrier is 0, the type of the first subframe is a subframe, and the first number is 0.

In this embodiment, when the quantity of symbols included in the mini-slot is fixed, and the starting position of the preempted unlicensed carrier is a symbol boundary and the symbol number corresponding to the starting position of the preempted unlicensed carrier is greater than 0 and is less than 7, the symbol number corresponding to the starting position of the preempted unlicensed carrier is subtracted from 7, to obtain a first symbol quantity. When the first symbol quantity is greater than or equal to a second symbol quantity, a remainder is calculated by dividing the first symbol quantity by the second symbol quantity. The type of the first subframe is a mini-slot and a slot, and the first number is a sum of the symbol number corresponding to the starting position of the preempted unlicensed carrier and the remainder. When the first symbol quantity is less than the second symbol quantity, the type of the first subframe is a slot, and the first number is 7. The second symbol quantity is equal to the quantity of symbols included in the mini-slot, and the mini-slot of the mini-slot and the slot includes a quantity of symbols that is obtained by subtracting the first number from 7. A position between the starting position of the preempted unlicensed carrier and the first number is used to send a reservation symbol.

In this embodiment, when the quantity of symbols included in the mini-slot is fixed, and the starting position of the preempted unlicensed carrier is not a symbol boundary and the symbol number corresponding to the starting position of the preempted unlicensed carrier is greater than or equal to 0 and is less than 6, a second number is subtracted from 7 to obtain a first symbol quantity. When the first symbol quantity is greater than or equal to the second symbol quantity, a remainder is calculated by dividing the first symbol quantity by the second symbol quantity. The type of the first subframe is a mini-slot and a slot, and the first number is a sum of the second number and the remainder. When the first symbol quantity is less than the second symbol quantity, the type of the first subframe is a slot, and the first number is 7. The second number is a next number adjacent to the symbol number corresponding to the starting position of the preempted unlicensed carrier. The mini-slot of the mini-slot and the slot includes a quantity of symbols that is obtained by subtracting the first number from 7. A position between the starting position of the preempted unlicensed carrier and the first number is used to send a reservation symbol.

In this embodiment, when the quantity of symbols included in the mini-slot is fixed, and the starting position of the preempted unlicensed carrier is not a symbol boundary and the symbol number corresponding to the starting position of the preempted unlicensed carrier is 6, the type of the first subframe is a slot, and the first number is 7. A position between the starting position of the preempted unlicensed carrier and the number 7 is used to send a reservation symbol.

In this embodiment, when the quantity of symbols included in the mini-slot is fixed, and the starting position of the preempted unlicensed carrier is a symbol boundary and the symbol number corresponding to the starting position of the preempted unlicensed carrier is 7, the type of the first subframe is a slot, and the first number is 7.

In this embodiment, when the quantity of symbols included in the mini-slot is fixed, and the starting position of the preempted unlicensed carrier is a symbol boundary and the symbol number corresponding to the starting position of the preempted unlicensed carrier is greater than 7 and is less than 14, the symbol number corresponding to the starting position of the preempted unlicensed carrier is subtracted from 14, to obtain a first symbol quantity. When the first symbol quantity is greater than or equal to the second symbol quantity, a remainder is calculated by dividing the first symbol quantity by the second symbol quantity. The type of the first subframe is a mini-slot, and the first number is a sum of the symbol number corresponding to the starting position of the preempted unlicensed carrier and the remainder. When the first symbol quantity is less than the second symbol quantity, the type of the first subframe is a subframe, and the first number is 0. The mini-slot includes a quantity of symbols that is obtained by subtracting the first number from 14. A position between the starting position of the preempted unlicensed carrier and the first number is used to send a reservation symbol.

In this embodiment, when the quantity of symbols included in the mini-slot is fixed, and the starting position of the preempted unlicensed carrier is not a symbol boundary and the symbol number corresponding to the starting position of the preempted unlicensed carrier is greater than or equal to 7 and is less than 13, a second number is subtracted from 14 to obtain a first symbol quantity. When the first symbol quantity is greater than or equal to the second symbol quantity, a remainder is calculated by dividing the first symbol quantity by the second symbol quantity. The type of the first subframe is a mini-slot, and the first number is a sum of the second number and the remainder. When the first symbol quantity is less than the second symbol quantity, the type of the first subframe is a subframe, and the first number is 0. The mini-slot of the mini-slot and the slot includes a quantity of symbols that is obtained by subtracting the first number from 7. A position between the starting position of the preempted unlicensed carrier and the first number is used to send a reservation symbol.

In this embodiment, when the quantity of symbols included in the mini-slot is fixed, and the starting position of the preempted unlicensed carrier is not a symbol boundary and the symbol number corresponding to the starting position of the preempted unlicensed carrier is 13, the type of the first subframe is a subframe, and the first number is 0. A position between the starting position of the preempted unlicensed carrier and the first number is used to send a reservation symbol.

303. The base station sends the type of the first subframe and the first number to the terminal.

In this embodiment, after determining the first number and the type of the first subframe based on the starting position of the preempted unlicensed carrier, the base station may send the type of the first subframe and the first number to the terminal by using the unlicensed carrier or a licensed carrier, that is, send the type of the first subframe and the first number to the terminal by using DCI. Alternatively, new bit information may be added to the DCI or current bit information may be reused to send the type of the first subframe and the first number to the terminal.

304. The base station sends to-be-sent data to the terminal by using the preempted unlicensed carrier.

305. The terminal determines, based on the type of the first subframe, a decoding scheme used to decode the first subframe, and decodes the to-be-sent data based on the decoding scheme and the first number.

In this embodiment, after receiving the type of the first subframe and the number, the terminal determines, based on the type of the first subframe, a first decoding scheme used to decode the first subframe, and then decodes the to-be-sent data based on the decoding scheme and the first number.

In the subframe scheduling method described in FIG. 3, when preempting the unlicensed carrier, the base station obtains the starting position of the preempted unlicensed carrier, determines the first number and the type of the first subframe based on the starting position of the preempted unlicensed carrier, and sends the type of the first subframe and the first number to the terminal. Because the type of the first subframe is sent to the terminal, the terminal may directly determine, based on the type of the first subframe, a receiving and demodulation scheme corresponding to the first subframe, so that a processing process of the terminal can be simplified.

Figure 4:
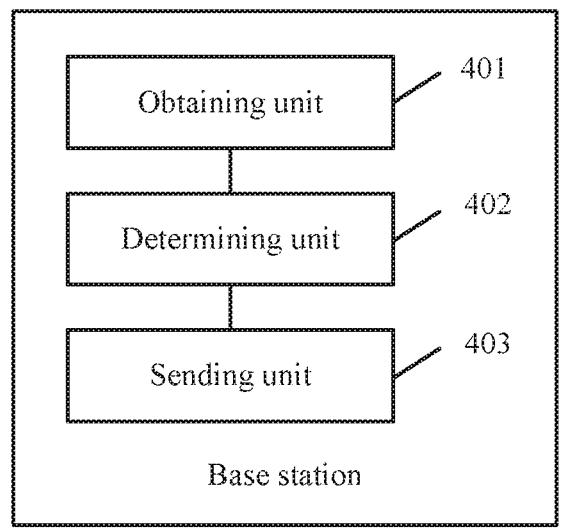
FIG. 4 is a schematic structural diagram of a base station according to an embodiment of the present invention.

Based on the network architecture shown in FIG. 2, referring to FIG. 4, FIG. 4 is a schematic structural diagram of a base station according to an embodiment of the present invention. As shown in FIG. 4, the base station may include:

an obtaining unit 401, configured to: when the base station preempts an unlicensed carrier, obtain a starting position of the preempted unlicensed carrier;

a determining unit 402, configured to determine a first number and a type of a first subframe based on the starting position obtained by the obtaining unit 401, where the first number is a symbol number corresponding to the starting position that is used by the base station to send data, and the first subframe is a subframe in which a symbol corresponding to the first number is located; and a sending unit 403, configured to send, to a terminal, the type that is determined by the determining unit 402 and that is of the first subframe and the first number determined by the determining unit 402.

In a possible implementation, a quantity of symbols included in a mini-slot is greater than 0 and is less than 7, and when the quantity of symbols included in the mini-slot is variable, the determining unit 402 may include:

when the starting position is a symbol boundary and the symbol number corresponding to the starting position is 0, determine that the type of the first subframe is a subframe, and determine that the first number is 0;

when the starting position is a symbol boundary and the symbol number corresponding to the starting position is greater than 0 and is less than 7, determine that the type of the first subframe is a mini-slot and a slot, and determine that the first number is the symbol number corresponding to the starting position;

when the starting position is not a symbol boundary and the symbol number corresponding to the starting position is greater than or equal to 0 and is less than 6, determine that the type of the first subframe is a mini-slot and a slot, and determine that the first number is a next number adjacent to the symbol number corresponding to the starting position; or when the starting position is not a symbol boundary and the symbol number corresponding to the starting position is 6, determine that the type of the first subframe is a slot, and determine that the first number is 7.

In a possible implementation, the determining unit 402 may further include:

when the starting position is a symbol boundary and the symbol number corresponding to the starting position is 7, determine that the type of the first subframe is a slot, and determine that the first number is 7;

when the starting position is a symbol boundary and the symbol number corresponding to the starting position is greater than 7 and is less than 14, determine that the type of the first subframe is a mini-slot, and determine that the first number is the symbol number corresponding to the starting position;

when the starting position is not a symbol boundary and the symbol number corresponding to the starting position is greater than or equal to 7 and is less than 13, determine that the type of the first subframe is a mini-slot, and determine that the first number is a next number adjacent to the symbol number corresponding to the starting position; or when the starting position is not a symbol boundary and the symbol number corresponding to the starting position is 13, determine that the type of the first subframe is a subframe, and determine that the first number is 0.

In a possible implementation, a quantity of symbols included in a mini-slot is greater than 0 and is less than 7, and when the quantity of symbols included in the mini-slot is fixed, the determining unit 402 may include:

when the starting position is a symbol boundary and the symbol number corresponding to the starting position is 0, determine that the type of the first subframe is a subframe, and determine that the first number is 0;

when the starting position is a symbol boundary and the symbol number corresponding to the starting position is greater than 0 and is less than 7, subtract the symbol number corresponding to the starting position from 7, to obtain a first symbol quantity;

when the first symbol quantity is greater than or equal to a second symbol quantity, determine that the type of the first subframe is a mini-slot and a slot, calculate a remainder by dividing the first symbol quantity by the second symbol quantity, and determine that the first number is a sum of the symbol number corresponding to the starting position and the remainder, where the second symbol quantity is equal to the quantity of symbols included in the mini-slot; or when the first symbol quantity is less than the second symbol quantity, determine that the type of the first subframe is a slot, and determine that the first number is 7.

In a possible implementation, the determining unit 402 may further include:

when the starting position is not a symbol boundary and the symbol number corresponding to the starting position is greater than or equal to 0 and is less than 6, subtract a second number from 7 to obtain a first symbol quantity, where the second number is a next number adjacent to the symbol number corresponding to the starting position;

when the first symbol quantity is greater than or equal to the second symbol quantity, determine that the type of the first subframe is a mini-slot and a slot, calculate a remainder by dividing the first symbol quantity by the second symbol quantity, and determine that the first number is a sum of the second number and the remainder;

when the first symbol quantity is less than the second symbol quantity, determine that the type of the first subframe is a slot, and determine that the first number is 7; or when the starting position is not a symbol boundary and the symbol number corresponding to the starting position is 6, determine that the type of the first subframe is a slot, and determine that the first number is 7.

In a possible implementation, the determining unit 402 may further include:

when the starting position is a symbol boundary and the symbol number corresponding to the starting position is 7, determine that the type of the first subframe is a slot, and determine that the first number is 7;

when the starting position is a symbol boundary and the symbol number corresponding to the starting position is greater than 7 and is less than 14, subtract the symbol number corresponding to the starting position from 14, to obtain a first symbol quantity;

when the first symbol quantity is greater than or equal to the second symbol quantity, determine that the type of the first subframe is a mini-slot, calculate a remainder by dividing the first symbol quantity by the second symbol quantity, and determine that the first number is a sum of the symbol number corresponding to the starting position and the remainder; or when the first symbol quantity is less than the second symbol quantity, determine that the type of the first subframe is a subframe, and determine that the first number is 0.

In a possible implementation, the determining unit 402 may further include:

when the starting position is not a symbol boundary and the symbol number corresponding to the starting position is greater than or equal to 7 and is less than 13, subtract a second number from 14 to obtain a first symbol quantity, where the second number is a next number adjacent to the symbol number corresponding to the starting position;

when the first symbol quantity is greater than or equal to the second symbol quantity, determine that the type of the first subframe is a mini-slot, calculate a remainder by dividing the first symbol quantity by the second symbol quantity, and determine that the first number is a sum of the second number and the remainder;

when the first symbol quantity is less than the second symbol quantity, determine that the type of the first subframe is a subframe, and determine that the first number is 0; or when the starting position is not a symbol boundary and the symbol number corresponding to the starting position is 13, determine that the type of the first subframe is a subframe, and determine that the first number is 0.

In a possible implementation, the sending unit 403 is specifically configured to send the type of the first subframe and the first number to the terminal by using DCI.

In a possible implementation, the sending unit 403 is specifically configured to: add new bit information to the DCI or reuse current bit information to send the type of the first subframe and the first number to the terminal.

In the base station described in FIG. 4, when preempting the unlicensed carrier, the base station obtains the starting position of the preempted unlicensed carrier, determines the first number and the type of the first subframe based on the starting position of the preempted unlicensed carrier, and sends the type of the first subframe and the first number to the terminal. Because the type of the first subframe is sent to the terminal, the terminal may directly determine, based on the type of the first subframe, a receiving and demodulation scheme corresponding to the first subframe, so that a processing process of the terminal can be simplified.

Figure 5:
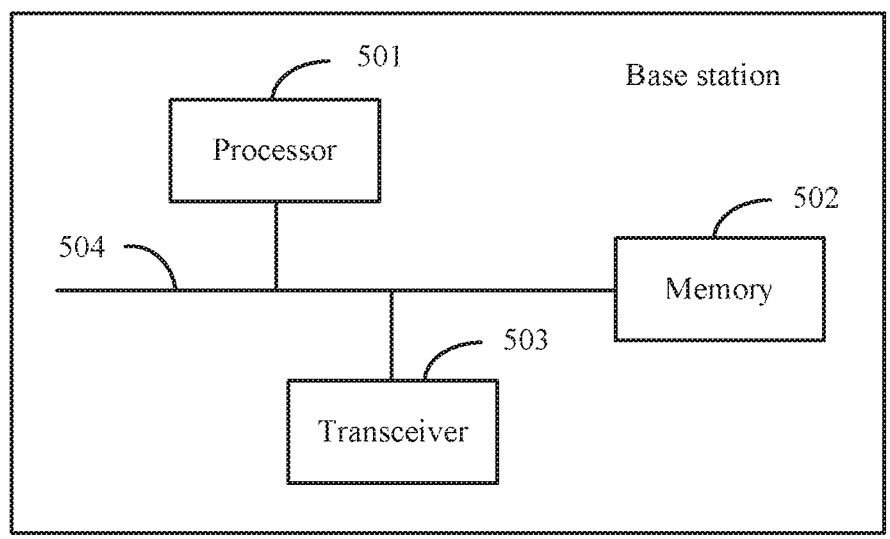
FIG. 5 is a schematic structural diagram of another base station according to an embodiment of the present invention.

Based on the network architecture shown in FIG. 1, referring to FIG. 5, FIG. 5 is a schematic structural diagram of another base station according to an embodiment of the present invention. As shown in FIG. 5, the base station may include a processor 501, a memory 502, a transceiver 503, and a bus 504. The processor 501 may be a central processing unit (CPU), a plurality of CPUs, a microprocessor, an application-specific integrated circuit (application-specific integrated circuit, ASIC), or one or more integrated circuits configured to control program execution in the solution of the present invention. The memory 502 may be a read-only memory (read-only memory, ROM) or another type of static storage device that can store static information and an instruction, or a random access memory (random access memory, RAM) or another type of dynamic storage device that can store information and an instruction, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including compressed optical disc, a laser disc, an optical disc, a digital versatile disc, a Blu-ray disc, and the like), a magnetic disk storage medium or another magnetic storage device, or any other medium that can be used to carry or store expected program code with an instruction or data structure form and that can be accessed by a computer. However, the present invention is not limited thereto. The memory 502 may independently exist, and the bus 504 is connected to the processor 501, The memory 502 and the processor 501 may be integrated together. The transceiver 503 is configured to communicate with another device or a communications network, such as the Ethernet, a radio access network (RAN), or a wireless local area network (Wireless Local Area Network, WLAN), The bus 504 may include a path on which information is transferred between the foregoing components.

A set of program code is stored in the memory 502, and the processor 501 is configured to invoke the program code stored in the memory 502 to perform the following operations:

when preempting an unlicensed carrier, obtaining, by the base station, a starting position of the preempted unlicensed carrier; and determining a first number and a type of a first subframe based on the starting position, where the first number is a symbol number corresponding to the starting position that is used by the base station to send data, and the first subframe is a subframe in which a symbol corresponding to the first number is located; and the transceiver 503 is configured to send the type of the first subframe and the first number to a terminal.

In a possible implementation, a quantity of symbols included in a mini-slot is greater than 0 and is less than 7, and when the quantity of symbols included in the mini-slot is variable, that the processor 501 determines a first number and a type of a first subframe based on the starting position includes:

when the starting position is a symbol boundary and the symbol number corresponding to the starting position is 0, determining that the type of the first subframe is a subframe, and determining that the first number is 0;

when the starting position is a symbol boundary and the symbol number corresponding to the starting position is greater than 0 and is less than 7, determining that the type of the first subframe is a mini-slot and a slot, and determining that the first number is the symbol number corresponding to the starting position;

when the starting position is not a symbol boundary and the symbol number corresponding to the starting position is greater than or equal to 0 and is less than 6, determining that the type of the first subframe is a mini-slot and a slot, and determining that the first number is a next number adjacent to the symbol number corresponding to the starting position; or when the starting position is not a symbol boundary and the symbol number corresponding to the starting position is 6, determining that the type of the first subframe is a slot, and determining that the first number is 7.

In a possible implementation, that the processor 501 determines a first number and a type of a first subframe based on the starting position further includes:

when the starting position is a symbol boundary and the symbol number corresponding to the starting position is 7, determining that the type of the first subframe is a slot, and determining that the first number is 7;

when the starting position is a symbol boundary and the symbol number corresponding to the starting position is greater than 7 and is less than 14, determining that the type of the first subframe is a mini-slot, and determining that the first number is the symbol number corresponding to the starting position;

when the starting position is not a symbol boundary and the symbol number corresponding to the starting position is greater than or equal to 7 and is less than 13, determining that the type of the first subframe is a mini-slot, and determining that the first number is a next number adjacent to the symbol number corresponding to the starting position; or when the starting position is not a symbol boundary and the symbol number corresponding to the starting position is 13, determining that the type of the first subframe is a subframe, and determining that the first number is 0.

In a possible implementation, a quantity of symbols included in a mini-slot is greater than 0 and is less than 7, and when the quantity of symbols included in the mini-slot is fixed, that the processor 501 determines a first number and a type of a first subframe based on the starting position includes:

when the starting position is a symbol boundary and the symbol number corresponding to the starting position is 0, determining that the type of the first subframe is a subframe, and determining that the first number is 0;

when the starting position is a symbol boundary and the symbol number corresponding to the starting position is greater than 0 and is less than 7, subtracting the symbol number corresponding to the starting position from 7, to obtain a first symbol quantity;

when the first symbol quantity is greater than or equal to a second symbol quantity, determining that the type of the first subframe is a mini-slot and a slot, calculating a remainder by dividing the first symbol quantity by the second symbol quantity, and determining that the first number is a sum of the symbol number corresponding to the starting position and the remainder, where the second symbol quantity is equal to the quantity of symbols included in the mini-slot; or when the first symbol quantity is less than the second symbol quantity, determining that the type of the first subframe is a slot, and determining that the first number is 7.

In a possible implementation, that the processor 501 determines a first number and a type of a first subframe based on the starting position further includes:

when the starting position is not a symbol boundary and the symbol number corresponding to the starting position is greater than or equal to 0 and is less than 6, subtracting a second number from 7 to obtain a first symbol quantity, where the second number is a next number adjacent to the symbol number corresponding to the starting position;

when the first symbol quantity is greater than or equal to the second symbol quantity, determining that the type of the first subframe is a mini-slot and a slot, calculating a remainder by dividing the first symbol quantity by the second symbol quantity, and determining that the first number is a sum of the second number and the remainder;

when the first symbol quantity is less than the second symbol quantity, determining that the type of the first subframe is a slot, and determining that the first number is 7; or when the starting position is not a symbol boundary and the symbol number corresponding to the starting position is 6, determining that the type of the first subframe is a slot, and determining that the first number is 7.

In a possible implementation, that the processor 501 determines a first number and a type of a first subframe based on the starting position further includes:

when the starting position is a symbol boundary and the symbol number corresponding to the starting position is 7, determining that the type of the first subframe is a slot, and determining that the first number is 7;

when the starting position is a symbol boundary and the symbol number corresponding to the starting position is greater than 7 and is less than 14, subtracting the symbol number corresponding to the starting position from 14, to obtain a first symbol quantity;

when the first symbol quantity is greater than or equal to the second symbol quantity, determining that the type of the first subframe is a mini-slot, calculating a remainder by dividing the first symbol quantity by the second symbol quantity, and determining that the first number is a sum of the symbol number corresponding to the starting position and the remainder; or when the first symbol quantity is less than the second symbol quantity, determining that the type of the first subframe is a subframe, and determining that the first number is 0.

In a possible implementation, that the processor 501 determines a first number and a type of a first subframe based on the starting position further includes:

when the starting position is not a symbol boundary and the symbol number corresponding to the starting position is greater than or equal to 7 and is less than 13, subtracting a second number from 14 to obtain a first symbol quantity, where the second number is a next number adjacent to the symbol number corresponding to the starting position;

when the first symbol quantity is greater than or equal to the second symbol quantity, determining that the type of the first subframe is a mini-slot, calculating a remainder by dividing the first symbol quantity by the second symbol quantity, and determining that the first number is a sum of the second number and the remainder;

when the first symbol quantity is less than the second symbol quantity, determining that the type of the first subframe is a subframe, and determining that the first number is 0; or when the starting position is not a symbol boundary and the symbol number corresponding to the starting position is 13, determining that the type of the first subframe is a subframe, and determining that the first number is 0.

In a possible implementation, that the transceiver 503 sends the type of the first subframe and the first number to a terminal includes:

sending the type of the first subframe and the first number to the terminal by using downlink control information DCI.

In a possible implementation, that the transceiver 503 sends the type of the first subframe and the first number to the terminal by using DCI includes:

adding new bit information to the DCI or reusing current bit information to send the type of the first subframe and the first number to the terminal.

Step 301 and step 302 may be performed by the processor 501 and the memory 502 in the base station, and step 303 and step 304 may be performed by the transceiver 503 in the base station. The obtaining unit 401 and the determining unit 402 may be implemented by the processor 501 and the memory 502 in the base station, and the sending unit 403 may be implemented by the transceiver 503 in the base station.

In the base station described in FIG. 5, when preempting the unlicensed carrier, the base station obtains the starting position of the preempted unlicensed carrier, determines the first number and the type of the first subframe based on the starting position of the preempted unlicensed carrier, and sends the type of the first subframe and the first number to the terminal. Because the type of the first subframe is sent to the terminal, the terminal may directly determine, based on the type of the first subframe, a receiving and demodulation scheme corresponding to the first subframe, so that a processing process of the terminal can be simplified.

An embodiment of the present invention further discloses a readable storage medium. The readable storage medium stores program code that is used by a base station to perform the subframe scheduling method shown in FIG. 3.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments may be performed. The foregoing storage medium may be a magnetic disk, an optical disc, a read-only memory (Read-Only Memory, ROM), a random access memory (Random Access Memory, RAM), or the like.

What is claimed is:

1. A subframe scheduling method, wherein the method is applied to a base station and comprises:
    preempting an unlicensed carrier, and obtaining, by the base station, a starting position of the preempted unlicensed carrier;
    determining a first number and a type of a first subframe based on the starting position, wherein the type of the first subframe is one of a subframe, a slot and mini-slot, a slot, and a mini-slot, and wherein the first number is a symbol number corresponding to the starting position that is used by the base station to send data, and the first subframe is a subframe in which a symbol corresponding to the first number is located; and
    sending the type of the first subframe and the first number to a terminal.

2. The method according to claim 1, wherein a quantity of symbols comprised in the mini-slot is greater than 0 and is less than 7, and when the quantity of symbols comprised in the mini-slot is variable, the determining the first number and the type of the first subframe based on the starting position comprises:
    when the starting position is a symbol boundary and the symbol number corresponding to the starting position is 0, determining that the type of the first subframe is a subframe, and determining that the first number is 0;
    when the starting position is a symbol boundary and the symbol number corresponding to the starting position is greater than 0 and is less than 7, determining that the type of the first subframe is a slot and a mini-slot, and determining that the first number is the symbol number corresponding to the starting position;
    when the starting position is not a symbol boundary and the symbol number corresponding to the starting position is greater than or equal to 0 and is less than 6, determining that the type of the first subframe is a slot and a mini-slot, and determining that the first number is a next number adjacent to the symbol number corresponding to the starting position; and
    when the starting position is not a symbol boundary and the symbol number corresponding to the starting position is 6, determining that the type of the first subframe is a slot, and determining that the first number is 7.

3. The method according to claim 2, wherein the determining the first number and the type of the first subframe based on the starting position further comprises:
    when the starting position is a symbol boundary and the symbol number corresponding to the starting position is 7, determining that the type of the first subframe is a slot, and determining that the first number is 7;
    when the starting position is a symbol boundary and the symbol number corresponding to the starting position is greater than 7 and is less than 14, determining that the type of the first subframe is a mini-slot, and determining that the first number is the symbol number corresponding to the starting position;
    when the starting position is not a symbol boundary and the symbol number corresponding to the starting position is greater than or equal to 7 and is less than 13, determining that the type of the first subframe is a mini-slot, and determining that the first number is a next number adjacent to the symbol number corresponding to the starting position; or
    when the starting position is not a symbol boundary and the symbol number corresponding to the starting position is 13, determining that the type of the first subframe is a subframe, and determining that the first number is 0.

4. The method according to claim 1, wherein a quantity of symbols comprised in the mini-slot is greater than 0 and is less than 7, and when the quantity of symbols comprised in the mini-slot is fixed, the determining the first number and the type of the first subframe based on the starting position comprises:
    when the starting position is a symbol boundary and the symbol number corresponding to the starting position is 0, determining that the type of the first subframe is a subframe, and determining that the first number is 0;
    when the starting position is a symbol boundary and the symbol number corresponding to the starting position is greater than 0 and is less than 7, subtracting the symbol number corresponding to the starting position from 7, to obtain a first symbol quantity;
    when the first symbol quantity is greater than or equal to a second symbol quantity, determining that the type of the first subframe is a mini-slot and a slot, calculating a remainder by dividing the first symbol quantity by the second symbol quantity, and determining that the first number is a sum of the symbol number corresponding to the starting position and the remainder, wherein the second symbol quantity is equal to the quantity of symbols comprised in the mini-slot; or
    when the first symbol quantity is less than the second symbol quantity, determining that the type of the first subframe is a slot, and determining that the first number is 7.

5. The method according to claim 4, wherein the determining the first number and the type of the first subframe based on the starting position further comprises:
    when the starting position is not a symbol boundary and the symbol number corresponding to the starting position is greater than or equal to 0 and is less than 6, subtracting a second number from 7 to obtain a first symbol quantity, wherein the second number is a next number adjacent to the symbol number corresponding to the starting position;
    when the first symbol quantity is greater than or equal to the second symbol quantity, determining that the type of the first subframe is a mini-slot and a slot, calculating a remainder by dividing the first symbol quantity by the second symbol quantity, and determining that the first number is a sum of the second number and the remainder;
    when the first symbol quantity is less than the second symbol quantity, determining that the type of the first subframe is a slot, and determining that the first number is 7; or
    when the starting position is not a symbol boundary and the symbol number corresponding to the starting position is 6, determining that the type of the first subframe is a slot, and determining that the first number is 7.

6. The method according to claim 4, wherein the determining the first number and the type of the first subframe based on the starting position further comprises:
    when the starting position is a symbol boundary and the symbol number corresponding to the starting position is 7, determining that the type of the first subframe is a slot, and determining that the first number is 7;
    when the starting position is a symbol boundary and the symbol number corresponding to the starting position is greater than 7 and is less than 14, subtracting the symbol number corresponding to the starting position from 14, to obtain a first symbol quantity;

when the first symbol quantity is greater than or equal to the second symbol quantity, determining that the type of the first subframe is a mini-slot, calculating a remainder by dividing the first symbol quantity by the second symbol quantity, and determining that the first number is a sum of the symbol number corresponding to the starting position and the remainder; or when the first symbol quantity is less than the second symbol quantity, determining that the type of the first subframe is a subframe, and determining that the first number is 0.

7. The method according to claim 4, wherein the determining the first number and the type of the first subframe based on the starting position further comprises:

when the starting position is not a symbol boundary and the symbol number corresponding to the starting position is greater than or equal to 7 and is less than 13, subtracting a second number from 14 to obtain a first symbol quantity, wherein the second number is a next number adjacent to the symbol number corresponding to the starting position;

when the first symbol quantity is greater than or equal to the second symbol quantity, determining that the type of the first subframe is a mini-slot, calculating a remainder by dividing the first symbol quantity by the second symbol quantity, and determining that the first number is a sum of the second number and the remainder;

when the first symbol quantity is less than the second symbol quantity, determining that the type of the first subframe is a subframe, and determining that the first number is 0; or when the starting position is not a symbol boundary and the symbol number corresponding to the starting position is 13, determining that the type of the first subframe is a subframe, and determining that the first number is 0.

8. The method of claim 1, wherein the sending the type of the first subframe and the first number to a terminal comprises:

sending the type of the first subframe and the first number to the terminal by using downlink control information DCI.

9. The method according to claim 8, wherein the sending the type of the first subframe and the first number to the terminal by using DCI comprises:

adding new bit information to the DCI or reusing current bit information to send the type of the first subframe and the first number to the terminal.

10. The method of claim 2, wherein the sending the type of the first subframe and the first number to a terminal comprises:

sending the type of the first subframe and the first number to the terminal by using downlink control information DCI.

11. The method of claim 3, wherein the sending the type of the first subframe and the first number to a terminal comprises:

sending the type of the first subframe and the first number to the terminal by using downlink control information DCI.

12. The method of claim 4, wherein the sending the type of the first subframe and the first number to a terminal comprises:

sending the type of the first subframe and the first number to the terminal by using downlink control information DCI.

13. The method of claim 5, wherein the sending the type of the first subframe and the first number to a terminal comprises:

sending the type of the first subframe and the first number to the terminal by using downlink control information DCI.

14. The method of claim 6, wherein the sending the type of the first subframe and the first number to a terminal comprises:

sending the type of the first subframe and the first number to the terminal by using downlink control information DCI.

15. The method of claim 7, wherein the sending the type of the first subframe and the first number to a terminal comprises:

sending the type of the first subframe and the first number to the terminal by using downlink control information DCI.

16. A base station, comprising a processor, a memory, and a transceiver, wherein a set of program code is stored in the memory, and the processor is configured to invoke the program code stored in the memory to perform the following operations:

preempting an unlicensed carrier, and obtaining, by the base station, a starting position of the preempted unlicensed carrier; and determining a first number and a type of a first subframe based on the starting position, wherein the type of the first subframe is one of a subframe, a slot and mini-slot, a slot, and a mini-slot, and wherein the first number is a symbol number corresponding to the starting position that is used by the base station to send data, and the first subframe is a subframe in which a symbol corresponding to the first number is located; and the transceiver is configured to send the type of the first subframe and the first number to a terminal.

\* \* \* \* \*